US010630374B2

(12) United States Patent
Ashworth

(10) Patent No.: US 10,630,374 B2
(45) Date of Patent: Apr. 21, 2020

(54) ALLOCATING AND ADJUSTING POWER BETWEEN ACTIVE PORTS OF A MULTI-PORT BOOSTER

(71) Applicant: WILSON ELECTRONICS, LLC, St. George, UT (US)

(72) Inventor: Christopher Ken Ashworth, St. George, UT (US)

(73) Assignee: WILSON ELECTRONICS, LLC, St. George, UT (US)

(*) Notice: Subject to any disclaimer, the term of this patent is extended or adjusted under 35 U.S.C. 154(b) by 0 days.

(21) Appl. No.: 15/947,675

(22) Filed: Apr. 6, 2018

(65) Prior Publication Data

US 2018/0294868 A1 Oct. 11, 2018

Related U.S. Application Data

(60) Provisional application No. 62/482,629, filed on Apr. 6, 2017.

(51) Int. Cl.
*H04B 7/15* (2006.01)
*H04W 88/08* (2009.01)
(Continued)

(52) U.S. Cl.
CPC ..... *H04B 7/15535* (2013.01); *H04B 7/15507* (2013.01); *H04L 41/0823* (2013.01); *H04W 88/085* (2013.01)

(58) Field of Classification Search
CPC .......... H04W 88/085; H04W 72/0453; H04W 16/26; H04W 88/08; H04W 52/18;
(Continued)

(56) References Cited

U.S. PATENT DOCUMENTS 4,776,032 A 10/1988 Odate et al.
5,303,395 A 4/1994 Dayani
(Continued)

FOREIGN PATENT DOCUMENTS

EP 1525678 B1 7/2008
EP 2157694 A1 2/2010
(Continued)

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Philip Sobutka
(74) *Attorney, Agent, or Firm* — Thorpe North & Western

(57) ABSTRACT

Technology for a multi-port repeater is disclosed. The multi-port repeater can include a plurality of ports. The multi-port repeater can include one or more amplifiers coupled to the plurality of ports. The multi-port repeater can determine one or more active ports from the plurality of ports. The multi-port repeater can determine an allocation of transmit power or gain between the one or more active ports up to a composite transmit power or gain. The multi-port repeater can adjust an output power or gain of each of the one or more amplifiers based on the allocation of the transmit power or gain between the one or more active ports.

36 Claims, 6 Drawing Sheets

US 10,630,374 B2

Page 2

(51) Int. Cl.
*H04B 7/155* (2006.01)
*H04L 12/24* (2006.01)

(58) Field of Classification Search
CPC . H04W 24/02; H04W 72/048; H04W 52/367; H04W 52/34; H04B 7/15542; H04B 7/15535; H04B 7/15507; H04L 41/0823
USPC ...................................... 455/7–25
See application file for complete search history.

(56) References Cited

U.S. PATENT DOCUMENTS

| | | | |
|---|---|---|---|
| 5,550,813 A | 8/1996 | Vella-Coleiro | |
| 5,737,687 A | 4/1998 | Martin et al. | |
| 5,777,530 A | 7/1998 | Nakatuka | |
| 5,835,848 A | 11/1998 | Bi et al. | |
| 5,960,034 A | 9/1999 | Lo | |
| 6,005,884 A | 12/1999 | Cook et al. | |
| 6,292,371 B1 | 9/2001 | Toner, Jr. | |
| 6,323,742 B1 | 11/2001 | Ke | |
| 6,424,634 B1 | 7/2002 | Shiffman et al. | |
| 6,584,330 B1 | 6/2003 | Ruuska | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,171,173 B2 | 1/2007 | Zangerl | |
| 7,221,967 B2 | 5/2007 | Van Buren et al. | |
| 7,486,892 B2 | 2/2009 | Buabbud et al. | |
| 7,706,744 B2 | 4/2010 | Rodgers et al. | |
| 7,729,656 B2 | 6/2010 | Van Buren | |
| 7,912,431 B2 | 3/2011 | Phillips et al. | |
| 7,974,573 B2 | 7/2011 | Dean | |
| 8,005,513 B2 | 8/2011 | Risheq et al. | |
| 8,036,594 B2 | 10/2011 | Schadler | |
| 8,712,466 B2 | 4/2014 | Martineau et al. | |
| 8,755,399 B1 | 6/2014 | Van Buren et al. | |
| 8,760,241 B1 | 6/2014 | Ashworth et al. | |
| 9,054,664 B1 | 6/2015 | Ashworth et al. | |
| 9,444,543 B2 | 9/2016 | Ashworth et al. | |
| 2002/0005800 A1 | 1/2002 | Caille et al. | |
| 2002/0044594 A1 | 4/2002 | Bongfeldt | |
| 2002/0123306 A1 | 9/2002 | Masoian | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0107052 A1 | 5/2005 | Zangerl | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0099667 A1 | 5/2007 | Graham et al. | |
| 2007/0188235 A1 | 8/2007 | Dean | |
| 2008/0014862 A1 | 1/2008 | Van Buren et al. | |
| 2008/0076437 A1 | 3/2008 | Wilson et al. | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2009/0156118 A1 | 6/2009 | Schadler | |
| 2009/0181722 A1 | 7/2009 | Stensson | |
| 2009/0316609 A1 | 12/2009 | Singh | |
| 2009/0325481 A1 | 12/2009 | Mohebbi | |
| 2010/0146564 A1 | 6/2010 | Halik et al. | |
| 2010/0197222 A1 | 8/2010 | Scheucher | |
| 2011/0151775 A1 | 6/2011 | Kang et al. | |
| 2011/0249708 A1 | 10/2011 | Maca | |
| 2012/0190316 A1 | 7/2012 | Martineau et al. | |
| 2012/0214406 A1 | 8/2012 | Risheq et al. | |
| 2012/0257659 A1 | 10/2012 | Braz et al. | |
| 2013/0203403 A1 | 8/2013 | Cook et al. | |
| 2014/0084700 A1 | 3/2014 | Anderson et al. | |
| 2015/0011157 A1* | 1/2015 | Terry ................. H04B 7/15535 455/10 |
| 2016/0028469 A1 | 1/2016 | Ashworth et al. | |
| 2016/0036403 A1 | 2/2016 | Ashworth et al. | |
| 2016/0277069 A1* | 9/2016 | Li ........................... H04B 3/32 |
| 2017/0163233 A1 | 6/2017 | Ashworth et al. | |
| 2019/0068154 A1 | 2/2019 | Ashworth et al. | |

FOREIGN PATENT DOCUMENTS

| | | |
|---|---|---|
| WO | WO 0106643 A1 | 1/2001 |
| WO | WO 0199271 A2 | 12/2001 |
| WO | WO 2016014787 A1 | 1/2016 |

OTHER PUBLICATIONS

ADL5513; "1 MHz to 4 GHz, 80 dB Logarithmic Detector/Controller"; Data Sheet; (2008); 12 pages; Analog Devices, Inc.
HMC713LP3E; "54 dB, Logarithmic Detector / Controller, 50-8000 MHz"; Data Sheet; (2010); 12 pages.
HMC909LP4E; "RMS Power Detector Single-Ended, DC-5.8 GHz"; Data Sheet; (2010); 21 pages.
International Search Report dated Jul. 30, 2018, in International Application No. PCT/US2018/026597, filed Apr. 6, 2018; 3 pages.
Emami et al.; "A 60GHz CMOS Phased-Array Transceiver Pair for Multi-Gb/s Wireless Communications;" in: IEEE International Solid-State Circuits Conference; (2011); pp. 164-166; <doi:.10.1109/ISSCC.2011.5746265 >.
MC44BC373/374; "Multi-Standard or PAL/NTSC Modulator with Integrated Antenna Booster/Splitter ICs;" (Jul. 2007); 24 pages; Rev. 3.5.
PIC16F873; "28/40-Pin 8-Bit CMOS Flash Microcontrollers;" (2001); Data Sheet; 218 pages.
Safarian et al.; "CMOS Distributed Active Power Combiners and Splitters for Multi-Antenna UWB Beamforming Transceivers;" IEEE Journal of Solid-State Circuits; (Jul. 2007); pp. 1481-1491; vol. 42, Issue 7; <doi: 10.1109/JSSC.2007.899121 >.

* cited by examiner

US 10,630,374 B2

ALLOCATING AND ADJUSTING POWER BETWEEN ACTIVE PORTS OF A MULTI-PORT BOOSTER

RELATED APPLICATIONS

The present application claims priority to U.S. Provisional Patent Application No. 62/482,629, filed Apr. 6, 2017, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
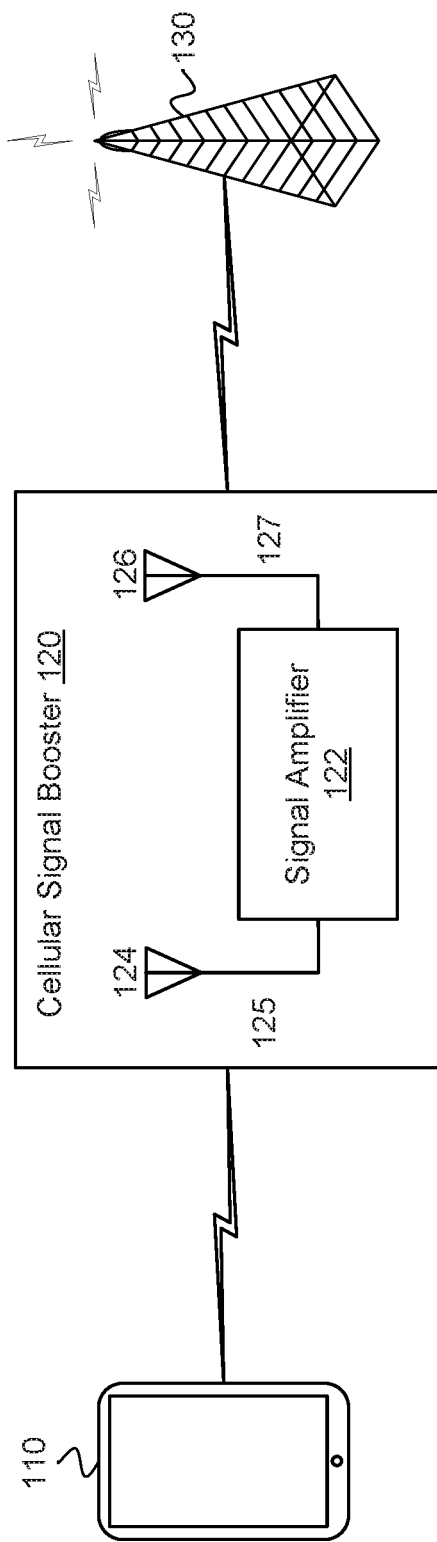
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 June 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (201610).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

In one configuration, wireless communication systems, such as cellular telephone systems, have become common throughout the world. A wireless repeater or repeater is a radio frequency (RF) device used to amplify wireless communication signals in both uplink and downlink communication channels. The uplink channel is generally referred to as the direction from one or more user equipment to a base station. The downlink channel is generally referred to as the direction from the base station to the user equipment. For a wireless telephone system, the base station may be a cell tower, and the user equipment may be one or more smart phones, tablet, laptop and desktop computers, multimedia devices such as a television or gaming system, cellular internet of things (CIoT) devices, or other types of computing devices. The repeater typically includes one or more signal amplifiers coupled between one or more user-side antennas coupled to one or more user-side ports and one or more service-side antennas coupled to one or more service-side ports of the repeater. Constraints imposed by government agencies, industry standards, or similar regulatory entities may limit the amount of amplification (gain), the maximum output power, the output noise, and other parameters associated with the operation of the repeater. Therefore, there is a continuing need for improved wireless repeaters.

In one aspect, repeaters for use in cellular telephone systems can automatically receive, amplify and retransmit on a bi-directional basis signals received from base, fixed, mobile, or portable stations, with no change in frequency or authorized bandwidth. The repeater can provide improved wireless coverage within a limited area such as a home, office building, car, boat or recreational vehicle (RV). The repeater can operate on the frequencies and in the market areas of a specified licensee service provider, or on the frequencies or in the market areas of multiple licensee service providers.

In one aspect, constraints imposed by government agencies, industry standards, or similar regulatory entities may limit the total amount of amplification (gain), the maximum output power, the output noise, and other parameters associated with the operation of consumer repeaters. When a repeater includes a plurality of user side ports or service side ports, the amount of amplification (gain), the maximum output power, the output noise, and/or other parameters associated with the operation of the repeater can be limited based upon a composite of all the user side ports or service side ports. In one implementation, where one or more of a plurality of user side ports or service side ports are not operating, any limits based upon the composite amplification (gain), the maximum output power, the output noise, and/or other parameters of all of the ports, deleteriously restricts the performance of the individual ports. For example, a regulator agency may limit the maximum output power of a repeater to 4 Watts (W). Therefore, if the repeater includes 4 ports, each port is limited to transmitting at 1 W. However, when only three of the four ports are being used for a particular repeater installation, each port transmits at 1 W and the total power from all three ports is 3 W. In accordance with embodiments of the present technology described herein, the composite amplification (gain), the maximum output power, the output noise, and/or other parameters is allocated to the active ports. Accordingly, the performance of the repeater is increased because the composite amplification (gain), the maximum output power, the output noise, and/or other parameters allocated across the active ports, and not all the ports including the inactive ports.

In one aspect, configuring the repeater can include optimizing the composite power and/or gain of a plurality of ports. In one aspect, one or more active server or donor ports of the repeater can be determined. The active ports can be determined based upon one or more predetermined parameters of the repeater, from one or more user inputs, from a determination of an impedance present at each port, from a determination of whether a communication signal is present at each port, or similar technique. In one aspect, the composite transmit power or gain can be allocated between each of the server ports that are determined to be active. The composite transmit power or gain can be divided in equal amount for each of the active server ports or in different amounts between the active server port. The allocation can be based on a predetermined allocation, a user specified allocation, a dynamically determined allocation, or similar basis. Allocating the composite transmit power or gain can advantageously improve the performance of the repeater when not all available server ports or donor ports are active.

Figure 2:
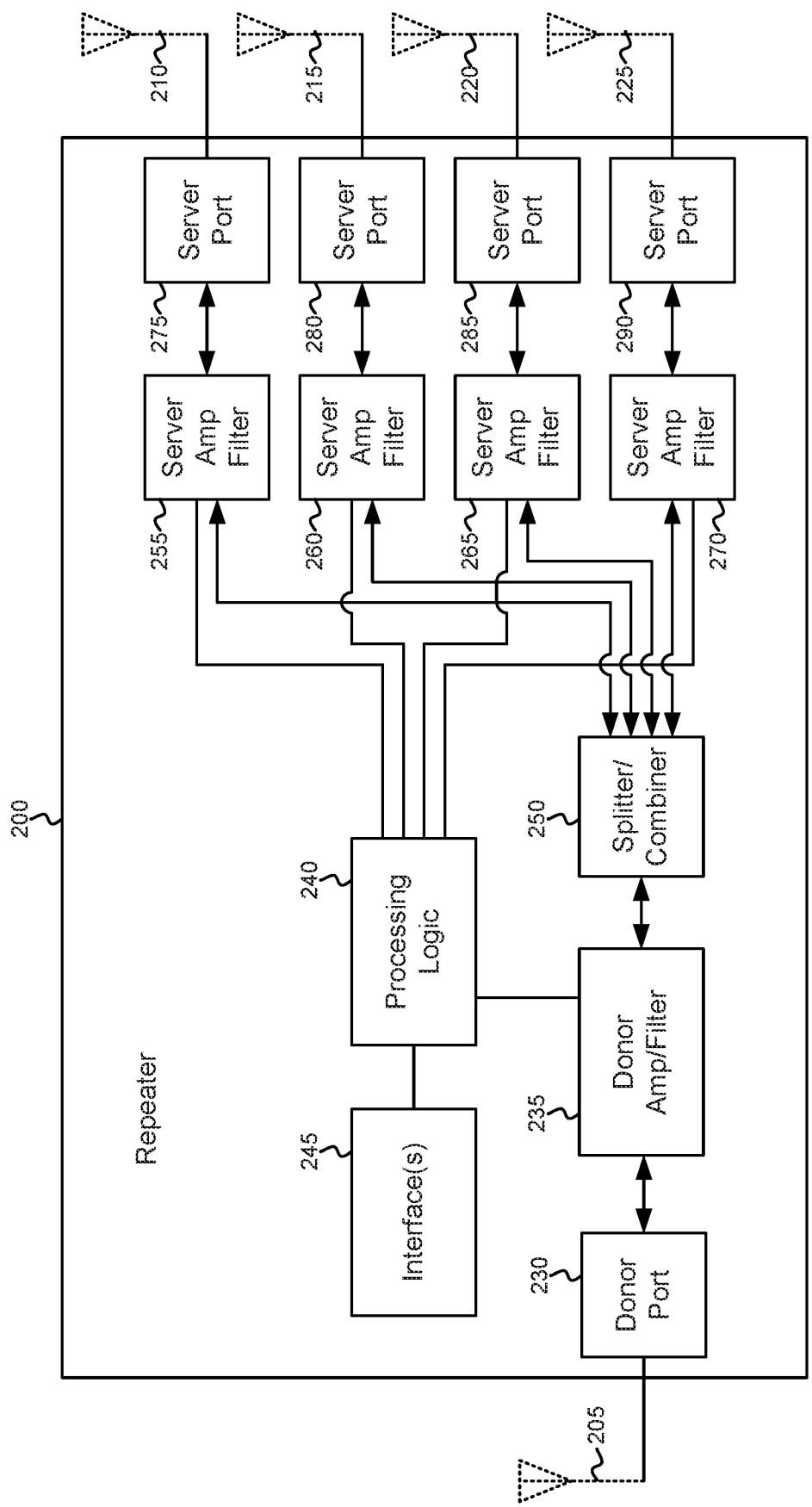
FIG. 2 depicts a repeater configurable for optimizing the composite power and/or gain of a plurality of server ports in accordance with an example.

FIG. 2 depicts a repeater configurable for optimizing the composite power and/or gain of a plurality of ports in accordance with an example. In one aspect, the repeater 200 can be coupled between one or more service side antennas 205 and a plurality of user side antennas 210-225. The antennas 205-225 can be removably coupled to the repeater 200 (e.g., remote external antennas), optionally by one or more wired communication links (e.g., coaxial cable). Alternatively, one or more of the antennas can be integral to the repeater 200 (e.g., internal or directly coupled external antenna). The antennas may be directional antennas, omnidirectional antennas or any combination thereof. In one instance, the one or more service side antenna 205 can be outside antennas adapted for placement outside a structure, and the plurality of user side antennas 210-225 can be inside antennas adapted for placement inside the structure. For example, the inside antennas may be located on different floors within an office building, or in different areas of a house.

In one aspect, the repeater 200 can include one or more donor ports 230, a plurality of amplifier/filter stages, processing logic 240, one or more interfaces 245, one or more splitter/combiners 250, and a plurality of server ports 275-290. In one aspect, the plurality of amplifier/filter stages can be configured to amplify one or more uplink signals and/or one or more downlink signals to improve transmission and reception for the base station and one or more user equipment devices. The plurality of amplifier/filter stages can also be configured to filter out noise on the uplink and/or downlink signals to improve uplink and/or downlink signals retransmitted by the repeater 200 to the base station and/or user equipment devices.

In one aspect, the plurality of amplifier/filter stages can include one or more donor amplifier/filters 235 and one or more server amplifier/filters 255-270. In one aspect, the one or more donor amplifier/filters 235 can be configured to apply a gain to the uplink signals that are provided to the donor port 230. The one or more donor amplifier/filters 235 can also apply gain to downlink signals received from the donor port 230. The one or more donor amplifier/filters may also be commonly referred to as a main amplifier/filter stage. The plurality of server amplifier/filters 255-270 can be configured to apply gain to downlink signals that are provided to respective server ports 275-290. The plurality of server amplifier/filters 255-270 can also apply gain to uplink signals received from the respective server ports 275-290. The plurality of sever amplifier/filters may also be commonly referred to as front end boosters.

In one aspect, the processing logic 240 can be coupled to the one or more uplink amplifier/filters 235 and the plurality of downlink amplifier/filters 255-270. The processing logic 240 can also be coupled to the one or more interfaces 245. The one or more uplink amplifier/filters 235 can be coupled between the one or more donor ports 230 and the plurality of server ports 275-290. The splitter/combiner 250 can be coupled between the one or more donor ports 230 and the plurality of downlink amplifier/filters 255-270. In one aspect, downlink signals received at the donor port 230 can be coupled to each of the plurality of downlink amplifier/filters 255-270 by the splitter/combiner 250.

In one aspect, the splitter/combiner 250 can split downlink signals received from the donor amplifier/filter 235 to provide the downlink signals to each of the plurality of server amplifier/filters 255-270. Splitting the downlink signal can replicate the downlink signals to each of the plurality of server amplifier/filters 255-270. In another aspect, the splitter/combiner 250 can combine uplink signals received from each of the server/filters 255-270 to provide the uplink signals to the donor amplifier/filter 235. It is to be appreciated the amplifier/filter stages 235, 255-270 can be bi-direction, such that the uplink and downlink power (signal or noise power) can be shared/distributed in different amounts between donor and server ports in various combinations.

In one instance, the one or more uplink amplifiers 235 and the plurality of downlink amplifiers 255-270 can be configured to amplify one or more RF communication signals. In one instance, the RF communication signals can be cellular telephone RF signals, such as a Third-Generation Partnership Project (3GPP) Long Term Evolved (LTE) signals. In one instance, the amplifiers 235 and 255-270 can be configured to amplify both uplink and downlink 3GPP LTE signals of one or more carrier bands. In one instance, the uplink 3GPP LTE signals may operate at a first frequency band and the downlink 3GPP LTE signals may operate at a second frequency band.

In one instance the operating bands of the RF communication signals may include B2, B4, B5, B12 and B13. In the uplink, B2 corresponds to a frequency range of 1850 MHz to 1910 MHz, B4 corresponds to a frequency range of 1710 MHz to 1755 MHz, B5 corresponds to a frequency range of 824 MHz to 849 MHz, B12 corresponds to a frequency range of 699 MHz to 716 MHz, and B13 corresponds to a frequency range of 777 MHz to 787 MHz. In the downlink, B2 corresponds to a frequency range of 1930 MHz to 1990 MHz, B4 corresponds to a frequency range of 2110 MHz to 2155 MHz, B5 corresponds to a frequency range of 869 MHz to 894 MHz, B12 corresponds to a frequency range of 729 MHz to 746 MHz, and B13 corresponds to a frequency range of 746 MHz to 756 MHz.

In one aspect, each server port 275-290 can be coupled to one or more respective user side antennas 210-225, and each donor port 230 can be coupled to one or more respective service side antennas 205. In some instances, not all of the server ports will be in use. For example, a repeater 200 may have four server ports 275-290. However, only two server ports may be active. In such case, service side antennas 210, 215 may be coupled to the two active server ports 275, 280, and the other two server ports 285, 290 may not have antennas coupled to them (not shown). In other cases, the other two ports 285, 290 may have antennas 220, 225 coupled to them, although the respective server ports 285, 290 are turned off or are inactive.

In one aspect, the processing logic 240 can selectively control the gain or output power of the one or more uplink amplifiers 235 and/or the gain or output power of the plurality of downlink amplifiers 255-270 based upon one or more predetermined parameters, one or more parameters determined by the processing logic 240 and/or one or more parameters received from the one or more interfaces 245. The one or more interfaces 245 can include one or more buttons, switches, keys or the like for receiving the one or more parameters, one or more displays for providing one or more graphical user interfaces for receiving the one or more parameters, and/or one or more wired or wireless network interfaces for receiving the one or more parameters from one or more other devices.

In one aspect, the processing logic 240 can be configured to determine one or more active server ports 275-290. In one aspect, the processing logic 240 can determine the one or more active server ports 275-290 from one or more parameters received from the user interface 245. In one instance, the user interface 245 may include a plurality of switches, wherein the state of each switch indicates weather a corresponding server port is active or inactive. In another instance, the user interface 245 may include a display and one or more button and/or keys that a user can use to indicate which server ports are active and which are inactive. In another instance, the user interface 245 may include a Bluetooth wireless interface by which a user can use a cellphone, tablet computer or the like to enter one or more parameters specifying which server ports are active and which are in active. In another instance, the processing logic 240 may sense the impedance at each server port to determine which server ports are active and which are inactive. For example, each port that the processing logic 240 determines to have an impedance of approximately 50-100 ohms ($\Omega$), which is the typical load presented by an antenna, may be determined to be active. Any server port that has an impedance of significantly more than 100$\Omega$ may be determined by the processing logic 240 to be inactive. In another instance, the processing logic 240 may determine the active and inactive ports based on whether uplink signals are present at each given server port. For example, if no uplink signals have been detected at a given server port in the past 10 milliseconds (ms), the port may be considered inactive. The server ports where uplink signals are currently being detected or have been detected in the last 10 ms may be considered active.

In one aspect, the processing logic 240 can determine an allocation of downlink transmit power or gain between the one or more active server ports up to a composite downlink power level or gain. For instance, a regulatory agency or a standards setting association may specify a maximum composite downlink transmit power or gain for the repeater 200. For example, the Federal Communication Commission (FCC) of the United States of America may specify that the combined transmit power of the downlink signal of the repeater cannot exceed 1 Watt. In one instance, the processing logic 240 may be configured with a predetermined allocation of the composite downlink transmit power or gain. For example, the processing logic 240 may be preconfigured to allocate the composite downlink transmit power or gain equally between each active server port. In another instance, one or more parameters received from a user through the one or more interfaces 245 may specify an allocation of the downlink transmit power or gain between the active server ports. For example, the user may specify through a touch screen display a percentage of the composite downlink transmit power level or gain to be allocated to each active port based in the approximate area covered by each active server port. In one example, a user may specify that 20% of the composite downlink transmit power be allocated to a first server port that is associated with a first area of a house that is approximately 25% of the total square foot space of the house, 20% may be allocated to a second server port associate with second area of approximately 20% of the total area, and 60% may be allocated to a third server port associated with a third area of approximately 55% of the total area of the house. In another instance, the composite downlink transmit power level can be dynamically allocated between the active server ports based upon whether uplink signals are present at each of the server ports. For example, if uplink signals are detected at four server ports, 25% of the composite downlink transmit power or gain can be allocated to each of the four active server ports. If an uplink signal is detected at two server ports, 50% of the composite downlink transmit power of gain can be allocated to the two active server ports. If an uplink signal is detected at just one server port, 100% of the composite downlink transmit power or gain can be allocated to the one active server port.

In one aspect, the processing logic 240 can adjust an output power or gain of each of the one or more downlink amplifiers based on the allocation of the downlink transmit power or gain between the one or more active server ports. In one instance, the processing logic 240 can adjust the output power or gain of the downlink amplifiers based on a predetermined allocation of the downlink transmit power or gain to the active server ports. In another instance, the processing logic 240 can adjust the output power or gain of the downlink amplifiers based on the allocation of the user specified downlink transmit power or gain to the active server ports. In another instance, the processing logic can adjust the output power or gain of the downlink amplifiers dynamically based on the allocation of the downlink transmit power or gain to the servicer ports active at the time.

Figure 3:
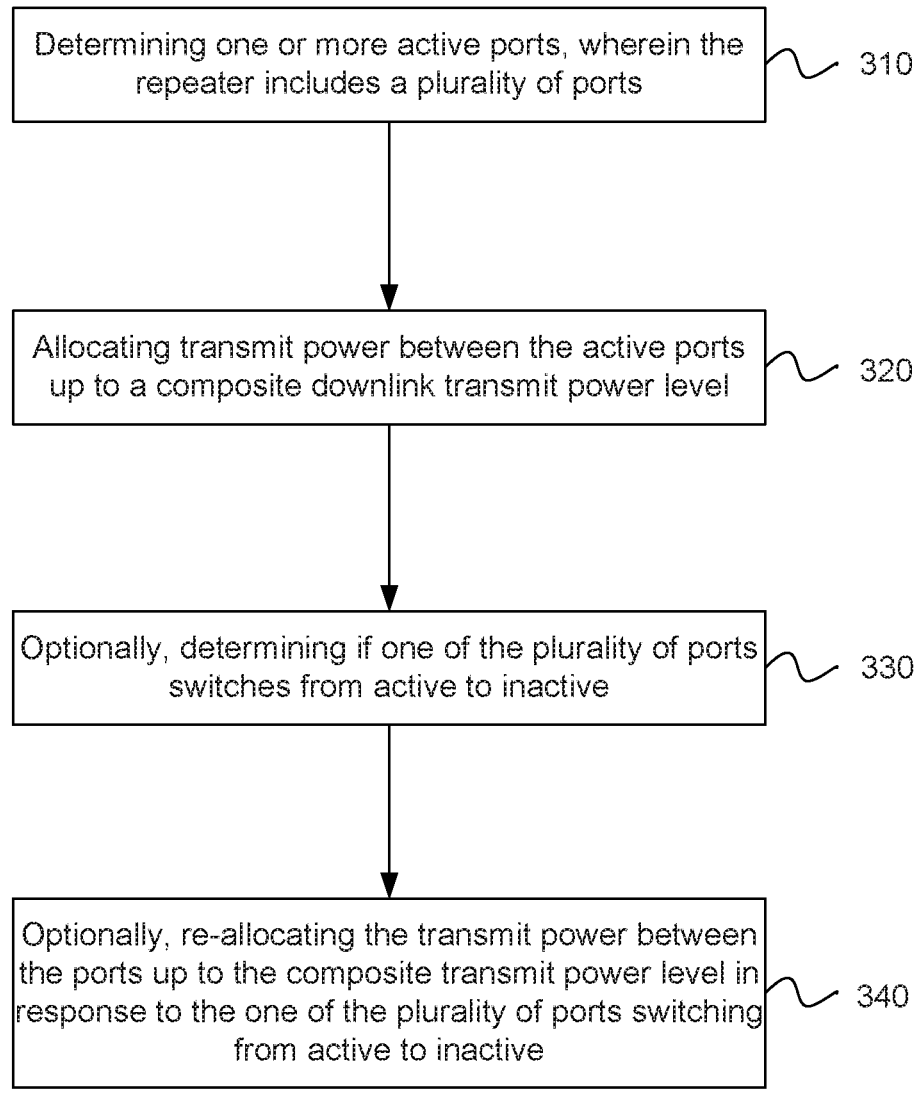
FIG. 3 depicts a method of configuring the power and/or gain of a repeater in accordance with an example.

FIG. 3 depicts a method of configuring the power and/or gain of a repeater in accordance with an example. In one aspect, the method can include determining one or more active ports of the repeater 310. In one instance, the active server ports are determined. In another instance, the active donor ports are determined. In one aspect, determining the active ports can include receiving an indication of the active ports from a user. In another aspect, determining the active ports can include determining an impedance for each of the plurality of ports. For example, the ports that have an impedance of approximately 50-100$\Omega$ can be determined to be active, and the ports with an impedance of more than 100$\Omega$ can be determined to be inactive. In one aspect, determining the active ports can include determining whether a communication signal is present on each port. For example, each server port that an uplink signal has been detected on, within a predetermined period of time, can be considered an active server port. Similarly, each donor port that a download signal has been detected on, within a predetermined period of time, can be considered an active donor port.

In one aspect, the transmit power or gain of the repeater can be allocated between the active ports up to a composite power or gain level 320. In one aspect, the downlink transmit power or gain can be allocated between the active server ports of the repeater. In another aspect, the uplink transmit power or gain can be allocated between the active donor ports of the repeater. In one aspect, the composite transmit power or gain level can be adjusted based on a user specified allocation. In another aspect, the allocation of the composite transmit power or gain level can be predetermined. For example, a predetermined allocation may specify that the composite transmit power or gain level be divided equally between the active port. In another aspect, the composite transmit power or gain level can be allocated in different amounts between the active server port or between the active donor ports. For example, a user may specify that 60% of the composite transmit power or gain level is to be allocated to a first active server port, and 20% of the composite transmit power or gain level be allocated to each of a second and third server port. In one aspect, allocating the composite transmit power or gain level can include decreasing power or gain to one of the one or more active ports below an equal amount of the composite transmit power level and increasing the power or gain to one or more of the other active ports a proportionate amount. In another aspect, allocating the composite transmit power or gain level can include increasing power or gain to one of the one or more active ports above an equal amount of the composite transmit power level and reducing the power or gain to one or more of the other active ports a proportionate amount.

In one aspect, it can be determined if one of the plurality of ports switches from an active state to an inactive state 330. For example, it can be determined if the load on any of the active ports changes from approximately 50-100Ω to more than 100Ω, or if an uplink signal has not been detected with a predetermined period of time. In one aspect, the transmit power or gain level can be re-allocated between the remaining active ports up to the composite transmit power of gain level in response to one of the plurality of ports switching from active to inactive 340. Similarly, it can be determined if one of the plurality of ports switches from inactive to active. In such case, the transmit power or gain level can be re-allocated between each of the currently active ports up to the composite transmit power level in response to one of the plurality of ports switching form inactive to active.

Figure 4:
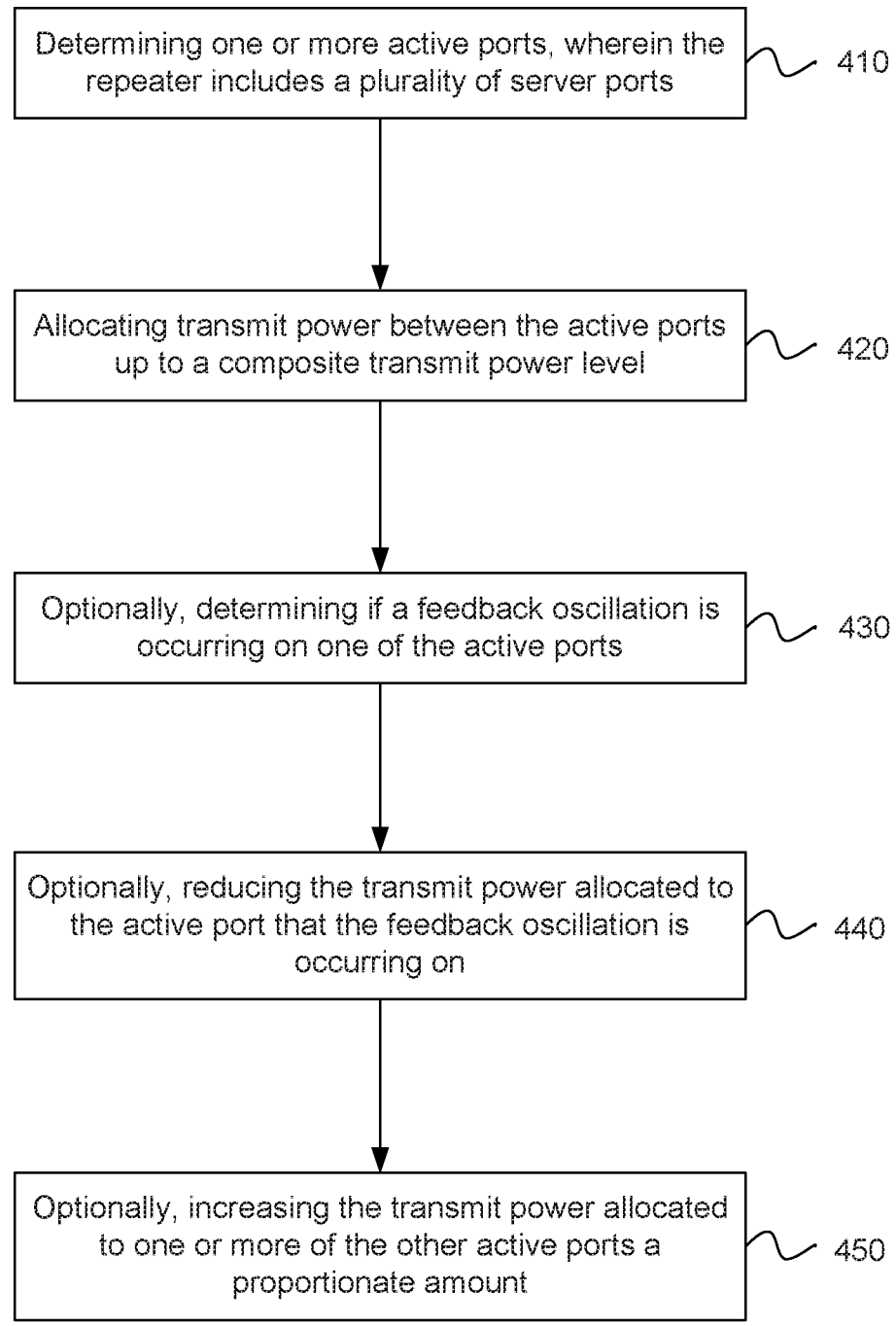
FIG. 4 depicts a method of configuring the power and/or gain of a repeater in accordance with another example.

FIG. 4 depicts a method of configuring the power and/or gain of a repeater in accordance with another example. In one aspect, the method can include determining one or more active ports of the repeater 410. In one instance, the active server ports are determined. In another instance, the active donor ports are determined. In one aspect, determining the active ports can include receiving an indication of the active port from a user. In another aspect, determining the active ports can include determining an impedance for each of the plurality of ports. For example, the ports that have an impedance of approximately 50-100Ω can be determined to be active, and the ports with an impedance of more than 100Ω can be determined to be inactive. In one aspect, determining the active ports can include determining whether a communication signal is present on each port. For example, each server port that an uplink signal has been detected on, within the past 50 milliseconds (ms), can be considered an active server port. Similarly, each donor port that a download signal has been detected on, within the past 50 ms, can be considered an active donor port.

In one aspect, the transmit power or gain of the repeater can be allocated between the active ports up to a composite power or gain level 420. Again, the downlink transmit power or gain can be allocated between the active server ports of the repeater, in one aspect. In another aspect, the uplink transmit power or gain can be allocated between the active donor ports of the repeater. In one aspect, the composite transmit power or gain level can be adjusted based on a user specified allocation. In another aspect, the allocation of the composite transmit power or gain level can be predetermined. For example, a predetermined allocation may specify that the composite transmit power or gain level be divided equally between the active port. In another aspect, the composite transmit power or gain level can be allocated in different amounts between the active ports. For example, a user may specify that 60% of the composite transmit power or gain level is to be allocated to a first active server port, and 20% of the composite transmit power or gain level be allocated to each of a second and third server port. In one aspect, allocating the composite transmit power or gain level can include decreasing power or gain to one of the one or more active ports below an equal amount of the composite transmit power level and increasing the power or gain to one or more of the other active ports a proportionate amount. In another aspect, allocating the composite transmit power or gain level can include increasing power or gain to one of the one or more active ports above an equal amount of the composite transmit power level and reducing the power or gain to one or more of the other active ports a proportionate amount.

In one aspect, it can be determined if a feedback oscillation is occurring on any of the active ports 430. For example, if the power or gain of the amplifier is too high the output at the server port, for example, may feedback into a donor port and can cause oscillations in the amplifier. The feedback oscillation can increase the noise in the repeater, saturate the amplifiers of the repeater, or the like, thereby decreasing the performance of the repeater or potentially damaging the repeater. In one aspect, if feedback oscillations are detected on a given active port, the transmit power or gain allocated to the given active port can be reduced to reduce the feedback oscillations below a predetermined level 440. In one aspect, the transmit power or gain allocated to one or more of the other active ports can be increase a proportional amount based upon the reduction in the transmit power or gain applied to the active port that the feedback oscillation were detected on 450.

Figure 5:
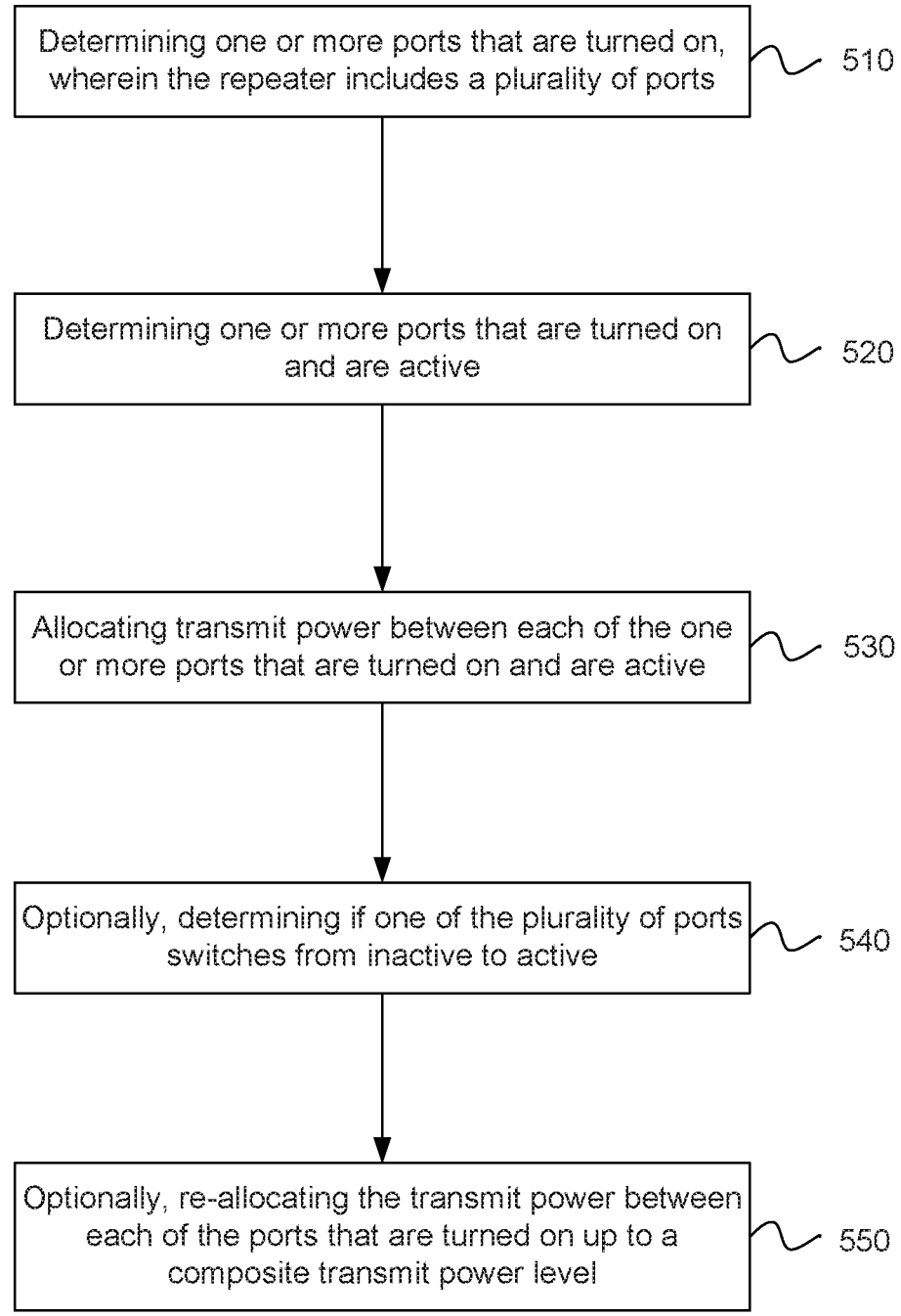
FIG. 5 depicts a method of configuring the power and/or gain of a repeater in accordance with another example.

FIG. 5 depicts a method of configuring the power and/or gain of a repeater in accordance with another example. In one aspect, the method can include determining one or more ports of the repeater that are turned on 510. In one instance, the plurality of ports can be either server ports or donor ports. In one aspect, a port is considered to be turned on if it is configured to be operational, and is considered turned off if it is configured not to be operational. In one aspect, determining which ports are on and which ports are off can include receiving an indication from a user. In another aspect, determining which ports are on and which port are off can include determining an impedance for each of the ports. For example, the ports that have an impedance of approximately 50-100Ω can be determined to be on, and the ports with an impedance of more than 100Ω can be determined to be off.

In one aspect, it can be determined which ports that are turned on are also active 520. In one aspect, a server port can be considered to be active if an uplink signal is currently being received at the server port or has previously been detected at the server port within a predetermined period of time. A server port can be considered inactive if an uplink signal has not been received within the predetermined period of time. Similarly, a donor port can be considered to be in active if a downlink signal is currently being received at the donor port or has been previously detected at the donor port within a predetermined period of time. A donor port can be considered inactive if a downlink signal has not been received within the predetermined period of time.

In one aspect, the transmit power or gain of the repeater can be allocated between each of the ports that are turned on and active 530. In one aspect, the downlink transmit power or gain can be allocated between the turned on and active server ports of the repeater. In another aspect, the uplink transmit power or gain can be allocated between the turned on and active donor ports of the repeater. In one aspect, the composite transmit power or gain level can be adjusted based on a user specified allocation. In another aspect, the allocation of the composite transmit power or gain level can be predetermined. For example, a predetermined allocation may specify that the composite transmit power or gain level be divided equally between the ports that are on and active. In another aspect, the composite transmit power or gain level can be allocated in different amounts between the ports that are on and active. For example, a user may specify that 60% of the composite transmit power or gain level is to be allocated to a first server port that is on and active, and 20% of the composite transmit power or gain level be allocated to each of a second and third server port that are both on and active. In one aspect, allocating the composite transmit power or gain level can include decreasing power or gain to one of the one or more ports that are on and active below an equal amount of the composite transmit power level and increasing the power or gain to one or more of the other on and active ports a proportionate amount. In another aspect, allocating the composite transmit power or gain level can include increasing power or gain to one of the one or more ports that are on and active above an equal amount of the composite transmit power level and reducing the power or gain to one or more of the other on and active ports a proportionate amount.

In one aspect, it can be determined if one of the plurality of ports that are turned on switches from an active state to an inactive state 540. For example, if an uplink signal has not been detected at a given server port within the predetermined period of time, the status of the given server port can be considered to have changed from active to inactive. In one aspect, the transmit power or gain level can be re-allocated between the remaining ports that are on and active, up to the composite transmit power of gain level, in response to one of the plurality of ports switching from active to inactive 550. Similarly, it can be determined if one of the plurality of ports switches from inactive to active. In such case, the transmit power or gain level can be re-allocated between each of the ports that are currently on and active, up to the composite transmit power level, in response to one of the plurality of ports switching form inactive to active.

Embodiments of the repeaters can advantageously be configured to allocate the power and/or gain of a plurality of amplifiers. The power and/or gain of the repeater can be allocated between the ports to optimize the use of the composite power and/or gain of the repeater. Embodiments can therefore optimize the use of the composite power and/or gain to increase the performance of the repeater.

Figure 6:
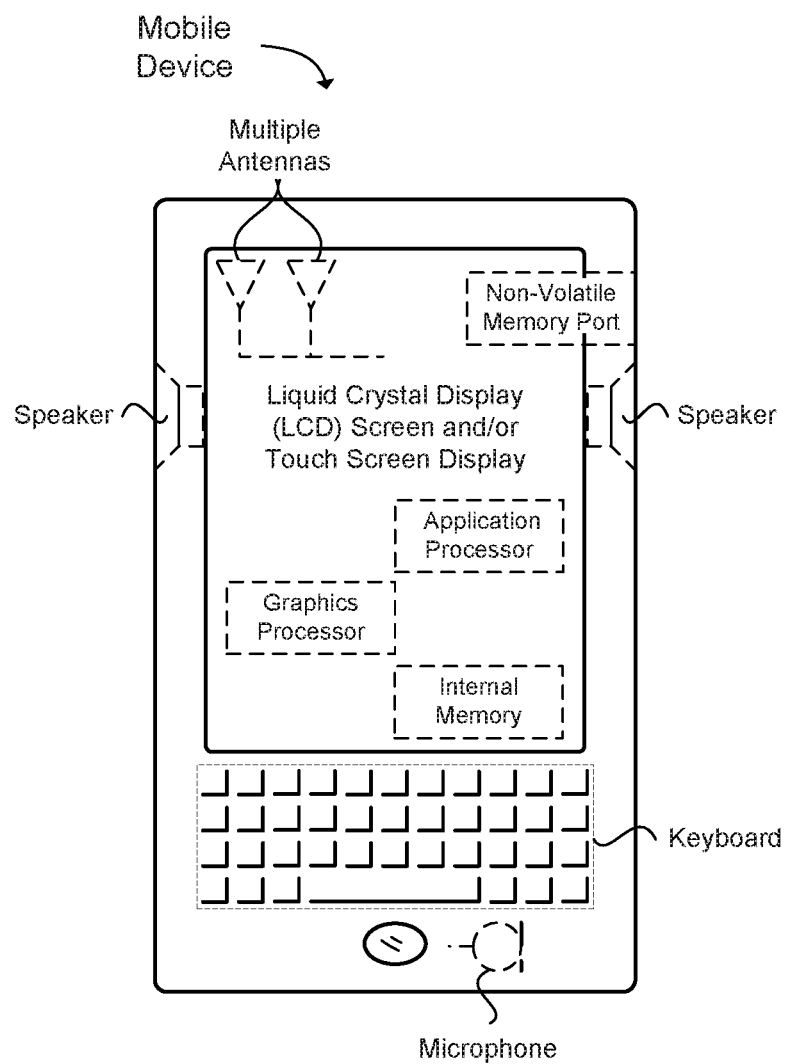
FIG. 6 illustrates a wireless device in accordance with an example.

FIG. 6 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a multi-port repeater comprising: a plurality of ports; one or more amplifiers coupled to the plurality of ports; and processing logic configured to: determine one or more active ports from the plurality of ports; determine an allocation of transmit power or gain between the one or more active ports up to a composite transmit power or gain; and adjust an output power or gain of each of the one or more amplifiers based on the allocation of the transmit power or gain between the one or more active ports.

Example 2 includes the multi-port repeater of Example 1, further comprising a user interface configured to receive one or more allocation indications, wherein the allocation indications are used by the processing logic to determine the allocation of the transmit power or gain.

Example 3 includes the multi-port repeater of any of Examples 1 to 2, further comprising a user interface configured to receive an active or inactive indication for one or more of the plurality of ports, wherein the active or inactive indication is used by the processing logic to determine the one or more active ports.

Example 4 includes the multi-port repeater of any of Examples 1 to 3, further comprising a network interface configured to receive one or more allocation indications, wherein the allocation indications are used by the processing logic to determine the allocation of the transmit power or gain.

Example 5 includes the multi-port repeater of any of Examples 1 to 4, further comprising a network interface configured to receive an active or inactive indication for one or more of the plurality of ports, wherein the active or inactive indication is used by the processing logic to determine the one or more active ports.

Example 6 includes the multi-port repeater of any of Examples 1 to 5, wherein: the one or more amplifiers include one or more server amplifiers; the plurality of ports include a plurality of server ports; and the one or more active ports include one or more active server ports.

Example 7 includes the multi-port repeater of any of Examples 1 to 6, wherein: the one or more amplifiers include one or more donor amplifiers; the plurality of ports include a plurality of donor ports; and the one or more active ports include one or more active donor ports.

Example 8 includes the multi-port repeater of any of Examples 1 to 7, wherein the processing logic is further configured to: determine when one of the plurality of ports switches from active to inactive; and re-allocate the transmit power or gain between the remaining active ports in response to the one of the plurality of ports switching from active to inactive.

Example 9 includes the multi-port repeater of any of Examples 1 to 8, wherein the processing logic is further configured to: determine when one of the plurality of ports switches from inactive to active; and re-allocate the transmit power or gain between each of the currently active ports in response to the one of the plurality of ports switching form inactive to active.

Example 10 includes the multi-port repeater of any of Examples 1 to 9, wherein the processing logic is further configured to: determine when a feedback oscillation is occurring on one of the active ports; reduce the transmit power or gain allocated to the active port that the feedback oscillation is occurring on; and increase the transmit power or gain allocated to one or more of the other active ports a proportionate amount.

Example 11 includes at least one non-transitory machine readable storage medium having instructions embodied thereon for configuring a power level at one or more ports of a repeater, the instructions when executed by a controller at repeater perform the following: determining, at the controller of the repeater, one or more server ports that are turned on, wherein the repeater includes a plurality of server ports; determining, at the controller of the repeater, one or more server ports that are turned on and are active; and allocating, at the controller of the repeater, downlink transmit power or gain between each of the one or more server ports that are turned on and are active.

Example 12 includes the at least one non-transitory machine readable storage medium of Example 11, further comprising instructions when executed perform the following: determining if one of the plurality of server ports switches from inactive to active; and re-allocating the downlink transmit power or gain between each of the server ports that are turned on up to a composite downlink transmit power or gain level.

Example 13 includes the at least one non-transitory machine readable storage medium of any of Examples 11 to 12, further comprising instructions when executed perform the following: determining if one of the plurality of server ports switches from active to inactive; and re-allocating the downlink transmit power or gain between the remaining active server ports up to the composite downlink transmit power or gain level in response to the one of the plurality of server ports switching from active to inactive.

Example 14 includes the at least one non-transitory machine readable storage medium of any of Examples 11 to 13, wherein determining one or more server ports that are turned on includes receiving an indication of the server ports that are turned on from a user.

Example 15 includes the at least one non-transitory machine readable storage medium of any of Examples 11 to 14, wherein determining one or more server ports that are turned on includes determining an impedance of each of the plurality of server ports.

Example 16 includes the at least one non-transitory machine readable storage medium of any of Examples 11 to 15, wherein determining one or more active server ports includes determining whether an uplink signal is present on each of the plurality of server ports.

Example 17 includes the at least one non-transitory machine readable storage medium of any of Examples 11 to 16, wherein allocation of the downlink transmit power or gain between each of the server ports that are turned on and active is user adjustable.

Example 18 includes the at least one non-transitory machine readable storage medium of any of Examples 11 to 17, wherein allocating the downlink transmit power or gain further comprises dividing the transmit power or gain in equal amounts for each of the server ports that are turned on and active.

Example 19 includes the at least one non-transitory machine readable storage medium of any of Examples 11 to 18, wherein the transmit power or gain is allocated in different amounts to at least two of the server ports that are turned on and active.

Example 20 includes the at least one non-transitory machine readable storage medium of any of Examples 11 to 19, wherein allocating the transmit power or gain includes decreasing power or gain to one of the one or more server ports that are turned on and active below an equal portion of the transmit power or gain and increasing the power or gain to one or more of the other server ports that are turned on and active.

Example 21 includes the at least one non-transitory machine readable storage medium of any of Examples 11 to 20, wherein allocating the transmit power or gain includes increasing power or gain to one of the one or more server ports that are turned on and active above an equal portion of the transmit power or gain and reducing the power or gain to one or more of the other server ports that are turned on and active.

Example 22 includes a method of configuring a power level at one or more ports of a repeater, the method comprising: determining one or more active ports, wherein the repeater includes a plurality of ports; and allocating a composite transmit power or gain level between each of the active ports.

Example 23 includes the method of Example 22, wherein: the plurality of ports include a plurality of server ports; and the one or more active ports include one or more active server ports.

Example 24 includes the method of any of Examples 22 to 23, wherein: the plurality of ports includes a plurality of donor ports; and the one or more active ports include one or more active donor ports.

Example 25 includes the method of any of Examples 22 to 24, wherein determining one or more active ports includes receiving an indication of the active ports from a user.

Example 26 includes the method of any of Examples 22 to 25, wherein determining one or more active ports includes determining an impedance of each of the plurality of ports.

Example 27 includes the method of any of Examples 22 to 26, wherein determining one or more active ports includes determining whether a communication signal is present on each of the plurality of ports.

Example 28 includes the method of any of Examples 22 to 27, wherein the allocation of the composite transmit power or gain level between each of the active ports is user adjustable.

Example 29 includes the method of any of Examples 22 to 28, wherein allocating the composite transmit power or gain level further comprises dividing the composite transmit power or gain level in equal amounts for each of the active ports.

Example 30 includes the method of any of Examples 22 to 29, wherein the composite transmit power or gain level is allocated in different amounts to at least two of the active ports.

Example 31 includes the method of any of Examples 22 to 30, wherein allocating the composite transmit power or gain level includes decreasing power or gain to one of the one or more active ports below an equal amount of the composite transmit power or gain level and increasing the power or gain to one or more of the other active ports a proportionate amount.

Example 32 includes the method of any of Examples 22 to 31, wherein allocating the composite transmit power or gain level includes increasing power or gain to one of the one or more active ports above an equal amount of the composite transmit power or gain level and reducing the power or gain to one or more of the other active ports a proportionate amount.

Example 33 includes a method of configuring a power level at one or more ports of a repeater, the method comprising: determining one or more active server ports, wherein the repeater includes a plurality of server ports; and allocating downlink transmit power or gain between the active server ports up to a composite downlink transmit power or gain level.

Example 34 includes the method of Example 33, wherein the downlink transmit power or gain is allocated between the active server ports based on a specified distribution.

Example 35 includes the method of any of Examples 33 to 34, further comprising: determining if one of the plurality of server ports switches from active to inactive; and re-allocating the downlink transmit power or gain between the remaining active server ports up to the composite downlink transmit power or gain level in response to the one of the plurality of server ports switching from active to inactive.

Example 36 includes the method of any of Examples 33 to 35, further comprising: determining if one of the plurality of server ports switches from inactive to active; and re-allocating the downlink transmit power or gain between each of the currently active server ports up to the composite downlink transmit power or gain level in response to the one of the plurality of server ports switching form inactive to active.

Example 37 includes the method of any of Examples 33 to 36, further comprising: determining if a feedback oscillation is occurring on one of the active server ports; reducing the downlink transmit power or gain allocated to the active server port that the feedback oscillation is occurring on; and increasing the downlink transmit power or gain allocated to one or more of the other active server ports a proportionate amount.

Example 38 includes the method of any of Examples 33 to 37, wherein determining one or more active server ports includes receiving an indication of the active ports from a user.

Example 39 includes the method of any of Examples 33 to 38, wherein determining one or more active server ports includes determining an impedance of each of the plurality of server ports.

Example 40 includes the method of any of Examples 33 to 39, wherein determining one or more active server ports includes determining whether an uplink signal is present on each of the plurality of server ports.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include a signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A multi-port repeater comprising:
a plurality of ports;
one or more amplifiers coupled to the plurality of ports;
processing logic configured to:
    determine one or more active ports from the plurality of ports;
    determine an allocation of transmit power or gain between the one or more active ports up to a composite transmit power or gain; and
    adjust an output power or gain of each of the one or more amplifiers based on the allocation of the transmit power or gain between the one or more active ports; and
a user interface configured to receive one or more allocation indications, wherein the allocation indications are used by the processing logic to determine the allocation of the transmit power or gain.

2. The multi-port repeater of claim 1, wherein the user interface is configured to receive an active or inactive indication for one or more of the plurality of ports, wherein the active or inactive indication is used by the processing logic to determine the one or more active ports.

3. The multi-port repeater of claim 1, further comprising a network interface configured to receive one or more allocation indications, wherein the allocation indications are used by the processing logic to determine the allocation of the transmit power or gain.

4. The multi-port repeater of claim 1, further comprising a network interface configured to receive an active or inactive indication for one or more of the plurality of ports, wherein the active or inactive indication is used by the processing logic to determine the one or more active ports.

5. The multi-port repeater of claim 1, wherein:
the one or more amplifiers include one or more server amplifiers;
the plurality of ports include a plurality of server ports; and
the one or more active ports include one or more active server ports.

6. The multi-port repeater of claim 1, wherein:
the one or more amplifiers include one or more donor amplifiers;
the plurality of ports include a plurality of donor ports; and
the one or more active ports include one or more active donor ports.

7. The multi-port repeater of claim 1, wherein the processing logic is further configured to:
    determine when one of the plurality of ports switches from active to inactive; and re-allocate the transmit power or gain between the remaining active ports in response to the one of the plurality of ports switching from active to inactive.

8. The multi-port repeater of claim 1, wherein the processing logic is further configured to:
determine when one of the plurality of ports switches from inactive to active; and
re-allocate the transmit power or gain between each of the currently active ports in response to the one of the plurality of ports switching form inactive to active.

9. The multi-port repeater of claim 1, wherein the processing logic is further configured to:
determine when a feedback oscillation is occurring on one of the active ports;
reduce the transmit power or gain allocated to the active port that the feedback oscillation is occurring on; and
increase the transmit power or gain allocated to one or more of the other active ports a proportionate amount.

10. At least one non-transitory machine readable storage medium having instructions embodied thereon for configuring a power level at one or more ports of a repeater, the instructions when executed by a controller at repeater perform the following:
determining, at the controller of the repeater, one or more server ports that are turned on, wherein the repeater includes a plurality of server ports;
determining, at the controller of the repeater, one or more server ports that are turned on and are active; and
allocating, at the controller of the repeater, downlink transmit power or gain between each of the one or more server ports that are turned on and are active, wherein an allocation of the downlink transmit power or gain is user adjustable.

11. The at least one non-transitory machine readable storage medium of claim 10, further comprising instructions when executed perform the following:
determining if one of the plurality of server ports switches from inactive to active; and
re-allocating the downlink transmit power or gain between each of the server ports that are turned on up to a composite downlink transmit power or gain level.

12. The at least one non-transitory machine readable storage medium of claim 10, further comprising instructions when executed perform the following:
determining if one of the plurality of server ports switches from active to inactive; and
re-allocating the downlink transmit power or gain between the remaining active server ports up to the composite downlink transmit power or gain level in response to the one of the plurality of server ports switching from active to inactive.

13. The at least one non-transitory machine readable storage medium of claim 10, wherein determining one or more server ports that are turned on includes receiving an indication of the server ports that are turned on from a user.

14. The at least one non-transitory machine readable storage medium of claim 10, wherein determining one or more server ports that are turned on includes determining an impedance of each of the plurality of server ports.

15. The at least one non-transitory machine readable storage medium of claim 10, wherein determining one or more active server ports includes determining whether an uplink signal is present on each of the plurality of server ports.

16. The at least one non-transitory machine readable storage medium of claim 10, wherein allocating the downlink transmit power or gain further comprises dividing the transmit power or gain in equal amounts for each of the server ports that are turned on and active.

17. The at least one non-transitory machine readable storage medium of claim 10, wherein the transmit power or gain is allocated in different amounts to at least two of the server ports that are turned on and active.

18. The at least one non-transitory machine readable storage medium of claim 10, wherein allocating the transmit power or gain includes decreasing power or gain to one of the one or more server ports that are turned on and active below an equal portion of the transmit power or gain and increasing the power or gain to one or more of the other server ports that are turned on and active.

19. The at least one non-transitory machine readable storage medium of claim 10, wherein allocating the transmit power or gain includes increasing power or gain to one of the one or more server ports that are turned on and active above an equal portion of the transmit power or gain and reducing the power or gain to one or more of the other server ports that are turned on and active.

20. A method of configuring a power level at one or more ports of a repeater, the method comprising:
determining one or more active ports based on an indication of the active ports received from a user, wherein the repeater includes a plurality of ports; and
allocating a composite transmit power or gain level between each of the active ports.

21. The method of claim 20, wherein:
the plurality of ports include a plurality of server ports; and
the one or more active ports include one or more active server ports.

22. The method of claim 20, wherein:
the plurality of ports include a plurality of donor ports; and
the one or more active ports include one or more active donor ports.

23. The method of claim 20, wherein determining one or more active ports includes determining an impedance of each of the plurality of ports.

24. The method of claim 20, wherein determining one or more active ports includes determining whether a communication signal is present on each of the plurality of ports.

25. The method of claim 20, wherein the allocation of the composite transmit power or gain level between each of the active ports is user adjustable.

26. The method of claim 20, wherein allocating the composite transmit power or gain level further comprises dividing the composite transmit power or gain level in equal amounts for each of the active ports.

27. The method of claim 20, wherein the composite transmit power or gain level is allocated in different amounts to at least two of the active ports.

28. The method of claim 20, wherein allocating the composite transmit power or gain level includes decreasing power or gain to one of the one or more active ports below an equal amount of the composite transmit power or gain level and increasing the power or gain to one or more of the other active ports a proportionate amount.

29. The method of claim 20, wherein allocating the composite transmit power or gain level includes increasing power or gain to one of the one or more active ports above an equal amount of the composite transmit power or gain level and reducing the power or gain to one or more of the other active ports a proportionate amount.

30. A method of configuring a power level at one or more ports of a repeater, the method comprising:

determining one or more active server ports, wherein the repeater includes a plurality of server ports;

allocating downlink transmit power or gain between the active server ports up to a composite downlink transmit power or gain level;

determining if a feedback oscillation is occurring on one of the active server ports;

reducing the downlink transmit power or gain allocated to the active server port that the feedback oscillation is occurring on; and increasing the downlink transmit power or gain allocated to one or more of the other active server ports a proportionate amount.

31. The method of claim 30, wherein the downlink transmit power or gain is allocated between the active server ports based on a specified distribution.

32. The method of claim 30, further comprising:

determining if one of the plurality of server ports switches from active to inactive; and re-allocating the downlink transmit power or gain between the remaining active server ports up to the composite downlink transmit power or gain level in response to the one of the plurality of server ports switching from active to inactive.

33. The method of claim 30, further comprising:

determining if one of the plurality of server ports switches from inactive to active; and re-allocating the downlink transmit power or gain between each of the currently active server ports up to the composite downlink transmit power or gain level in response to the one of the plurality of server ports switching form inactive to active.

34. The method of claim 30, wherein determining one or more active server ports includes receiving an indication of the active ports from a user.

35. The method of claim 30, wherein determining one or more active server ports includes determining an impedance of each of the plurality of server ports.

36. The method of claim 30, wherein determining one or more active server ports includes determining whether an uplink signal is present on each of the plurality of server ports.

* * * * *